United States Patent
Kinugasa

(10) Patent No.: US 6,470,035 B1
(45) Date of Patent: Oct. 22, 2002

(54) RECEIVER FOR RECEIVER A SIGNAL TRANSMITTED BY A TIME-DIVISION MULTI-ACCESS METHOD

(75) Inventor: Yasushi Kinugasa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/260,805

(22) Filed: Mar. 2, 1999

(30) Foreign Application Priority Data

Mar. 3, 1998 (JP) .......................................... 10-050352

(51) Int. Cl.[7] .................................................. H04J 3/06
(52) U.S. Cl. ........................ 370/516; 370/280; 370/296; 370/314; 370/343; 370/468; 370/516
(58) Field of Search ................................. 370/280, 282, 370/294, 314, 321, 343, 468, 319, 516, 371, 374, 378, 383; 455/517

(56) References Cited

U.S. PATENT DOCUMENTS 5,210,773 A * 5/1993 Schmid et al. .................. 375/4
5,754,961 A * 5/1998 Serizawa et al. ............ 455/517
5,764,648 A * 6/1998 Yamane et al. ............. 370/516

* cited by examiner

Primary Examiner—Hassan Kizou
Assistant Examiner—Anh-Vu H Ly
(74) Attorney, Agent, or Firm—Arent Fox Kintner Plotkin & Kahn

(57) ABSTRACT

A receiver receives a signal transmitted by a time-division multi-access method that divides one frame into a plurality of communication slots in conducting communication. In this receiver, a detection circuit detects whether a received RF signal is stronger than a predetermined level. The received RF signal is demodulated by a demodulation circuit. An oscillation circuit generates a clock that is used to decode the data obtained by demodulation. The data obtained by demodulation is stored in a memory in synchronism with a clock reproduced from the received signal, and is then retrieved from the memory in synchronism with the clock generated by the oscillation circuit. This eliminates jitters. After jitter elimination, the data is decoded by a processing circuit. The writing/reading operation against the memory is initialized in accordance with a result output from the detection circuit.

10 Claims, 7 Drawing Sheets

| CUNT1 | 0 | 1 | 2 | 0 | 1 | 2 | 0 |
|---|---|---|---|---|---|---|---|
| CUNT2 | — | 0 | 1 | 2 | 0 | 1 | |

RECEIVER FOR RECEIVER A SIGNAL TRANSMITTED BY A TIME-DIVISION MULTI-ACCESS METHOD

BACKGROUND OF THE INVENTION

1. Field of the Invention

The present invention relates to a receiver for receiving a signal transmitted by a time-division multi-access (TDMA) method as used in a cellular telephone network like the Personal Handyphone System (hereinafter "PHS".

2. Description of the Prior Art

In a receiver (portable terminal) for receiving a signal transmitted by a time-division multi-access method as used in the PHS, the clock signal that is transmitted together with the data signal from a base station so as to be used for the demodulation of the data signal and the clock signal that is generated within the receiver for the processing of the demodulated data signal are asynchronous with respect to each other and have different frequencies. This makes it inevitable that the demodulated data signal is processed by a processing circuit (for example, a TDMA protocol circuit) that operates asynchronously with respect thereto, and thus causes jitters.

For this reason, a conventional receiver is provided with a jitter elimination circuit as shown schematically in FIG. 9. This jitter elimination circuit employs a FIFO (first-in-first-out) memory 60. The reproduced data RD1 and the reproduced clock RCLK that are obtained through demodulation of a received signal by a demodulator are fed to the memory 60 so that the reproduced data RD1 is stored in the FIFO memory 60 in synchronism with the reproduced clock RCLK. Then, the reproduced data is retrieved as RD2 from the FIFO memory 60 in synchronism with the clock CLK output from an oscillator provided within the receiver.

Since the frequency of the reproduced clock RCLK, which is a reproduction of the clock transmitted from the base station, is different from that of the clock output from the oscillator, the received data is first stored in the FIFO memory 60 in synchronism with the operation timing of the transmitting side, and is then retrieved therefrom in synchronism with the operation timing of the receiving side. This helps eliminate jitters. The retrieved data RD2 is then subjected to signal processing, such as waveform shaping and decoding, performed by a TDMA protocol section. In a case where the receiver is a PHS receiver, the processed data is output as sounds from a loudspeaker under the control of a CPU (central processing unit).

In a conventional receiver, the writing/reading operation against the FIFO memory 60 is reset for restarting (i.e. initialized) at the end of a receiving session, and therefore the writing/reading operation lasts for a comparatively long time interval (5 milliseconds) that corresponds to one frame in PHS communication. On the other hand, as described previously, the clock on the transmitting side (i.e. the transmitted clock) and the clock generated by an oscillation circuit on the receiving side have different frequencies. The difference in timing between these two clocks (i.e. the phase difference between the two clocks) becomes larger as time passes. This requires that, in the jitter elimination circuit shown in FIG. 9, the writing operation and the reading operation be performed at increasingly distant locations from each other, and accordingly that the FIFO memory 60 have an unduly large storage capacity as achieved by the use of, for example, RAM1 to RAM10. Note that RAM1 to RAM10 each correspond to, for example, one bit of data.

Moreover, a large loss of time arises between the time point when the reproduced data RD1 is stored in the FIFO memory 60 and the time point when it is retrieved as the reproduced data RD2, and this causes an undesirable delay in the processes performed by the receiver, for example, for achieving synchronism with the received signal and for searching for the base station that offers the best communication quality.

SUMMARY OF THE INVENTION

An object of the present invention is, in a receiver for receiving a signal transmitted by a time-division multi-access method, to minimize the storage capacity of the memory used by a jitter elimination circuit and minimize the delay from reception of a signal until starting of signal processing.

To achieve the above object, according to one aspect of the present invention, a receiver for receiving a signal transmitted by a time-division multi-access method is provided with: a signal strength detection circuit for detecting whether the signal strength of a signal transmitted by a time-division multi-access method is stronger than a predetermined level; a demodulator for demodulating the signal to output reproduced data and a reproduced clock; an oscillator for outputting an internal clock; a memory to which the reproduced data is written in synchronism with the reproduced clock and from which the reproduced data is read in synchronism with the internal clock; and an initialization circuit for initializing the timing with which the reproduced data is written to and read from the memory.

According to another aspect of the present invention, a receiver for receiving a signal transmitted by a time-division multi-access method that divides one frame into a plurality of communication slots in conducting communication is provided with: a detection circuit for detecting whether a received RF signal is stronger than a predetermined level; a demodulation circuit for demodulating the received RF signal to obtain therefrom reproduced data and a reproduced clock; an oscillation circuit for generating an internal clock; a jitter elimination circuit for eliminating jitters from the reproduced data by writing the reproduced data to a memory in synchronism with the reproduced clock and reading the reproduced data from the memory in synchronism with the internal clock; a processing circuit for decoding the reproduced data after jitter elimination; and an initialization circuit for initializing the jitter elimination circuit in accordance with a result output from the detection circuit.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
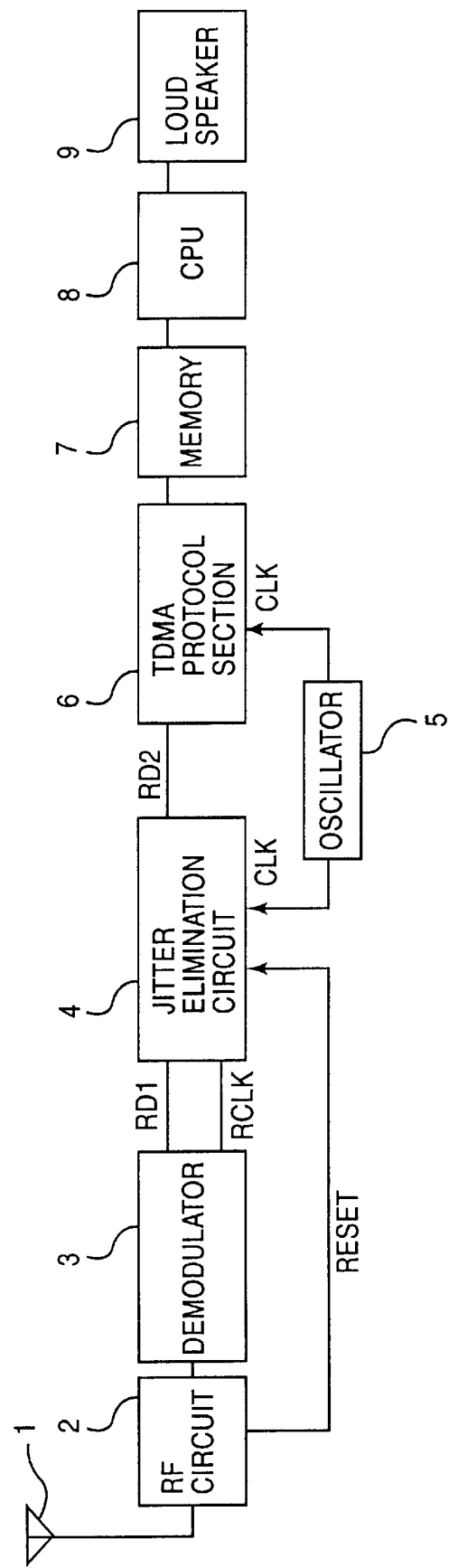
FIG. 1 is a block diagram of a receiver embodying the invention.

Hereinafter, an embodiment of the present invention will be described with reference to the accompanying drawings. FIG. 1 is a block diagram of a receiver embodying the invention. In this receiver, an antenna 1 receives a signal transmitted from a base station by a time-division multi-access method, and an RF (radio frequency) circuit 2 performs processing, such as RF amplification, on the received signal. As will be described later, the RF circuit 2 has a signal strength detection circuit 10 (see FIG. 2), with which it detects the signal strength of the received RF signal (i.e. the intensity of the electric field produced by the RF signal). In accordance with the detected signal strength, the RF circuit 2 outputs a reset signal RESET.

The RF signal output from the RF circuit 2 is demodulated by a demodulation circuit 3, which thereby outputs reproduced data RD1 and a reproduced clock RCLK. The jitters occurring between the reproduced clock RCLK and the clock output from an oscillation circuit 5, such as caused by the phase difference between these two clocks, are eliminated by a jitter elimination circuit 4. To achieve this, the jitter elimination circuit 4 stores the reproduced data RD1 to a FIFO memory 42 (see FIG. 6) provided therein in synchronism with the reproduced clock RCLK, and outputs it as reproduced data RD2 to a TDMA protocol section 6 provided in the next stage in synchronism with the clock CLK from the oscillation circuit 5.

On receiving the reproduced data RD2 from the jitter elimination circuit 4, the TDMA protocol section 6 performs waveform shaping and decoding on it in synchronism with the clock CLK from the oscillator 5, and outputs the decoded data. This data is stored in a memory 7. The data stored in the memory 7 is read by a CPU 8 and is output as sounds from a loudspeaker 9. Although no illustration is provided, it is also possible to output the data through an interface to a personal computer connected to the receiver.

Figure 2:
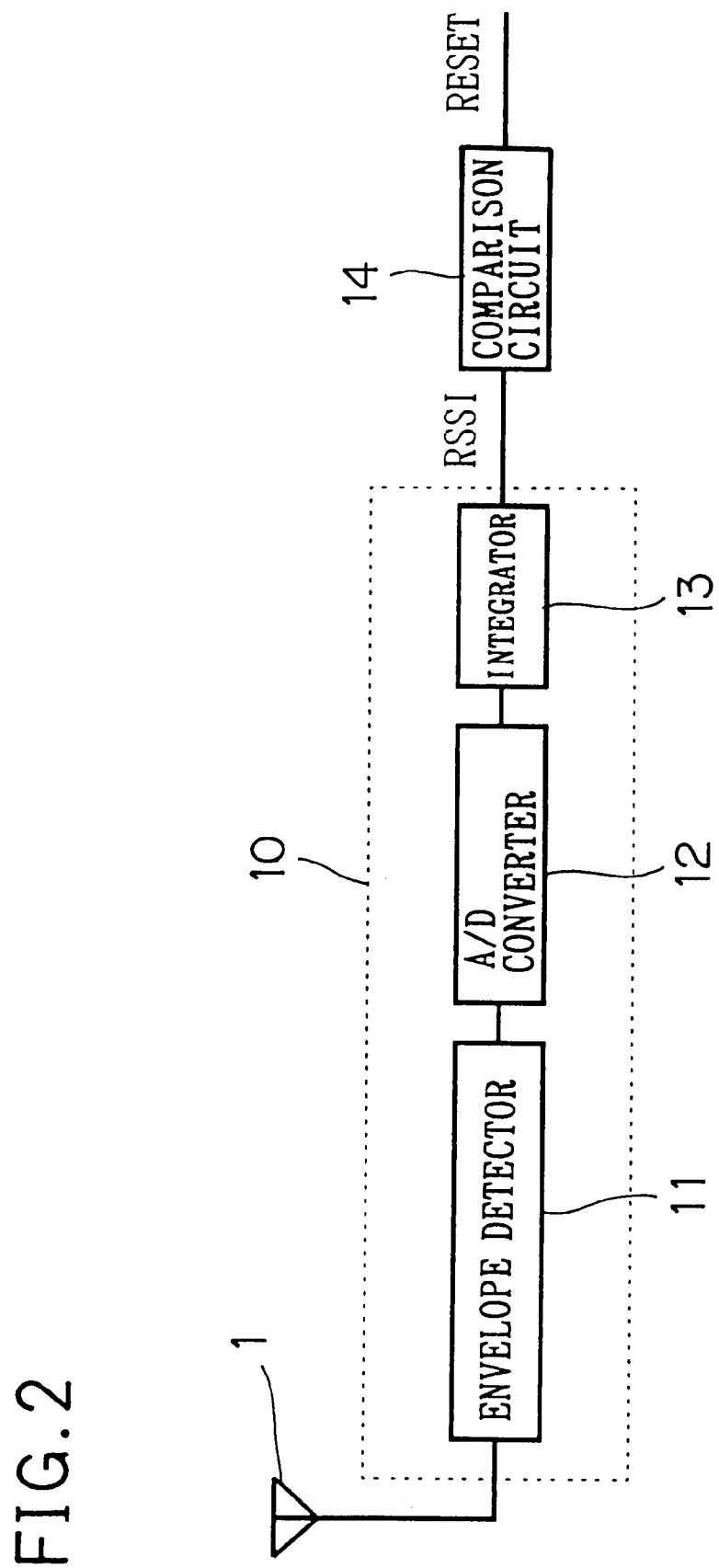
FIG. 2 is a block diagram showing the elements provided within and around the signal strength detection circuit incorporated in the RF circuit of the receiver of the embodiment.

FIG. 2 is a block diagram showing an example of the elements provided within and around the signal strength detection circuit 10 incorporated in the RF circuit 2 (see FIG. 1). Within the signal strength detection circuit 10, the RF signal received by the antenna 1 is first fed to an envelope detector 11 to extract the amplitude component thereof, and is then fed to an A/D converter 12 so as to be converted into a digital signal. This digital signal is integrated by an integrator 13, and is then output as a signal strength detection signal RSSI from the signal strength detection circuit 10. The signal RSSI is compared with a predetermined threshold voltage by a comparison circuit 14, and the result of comparison is output as the reset signal RESET from the RF circuit 2.

Figure 3:
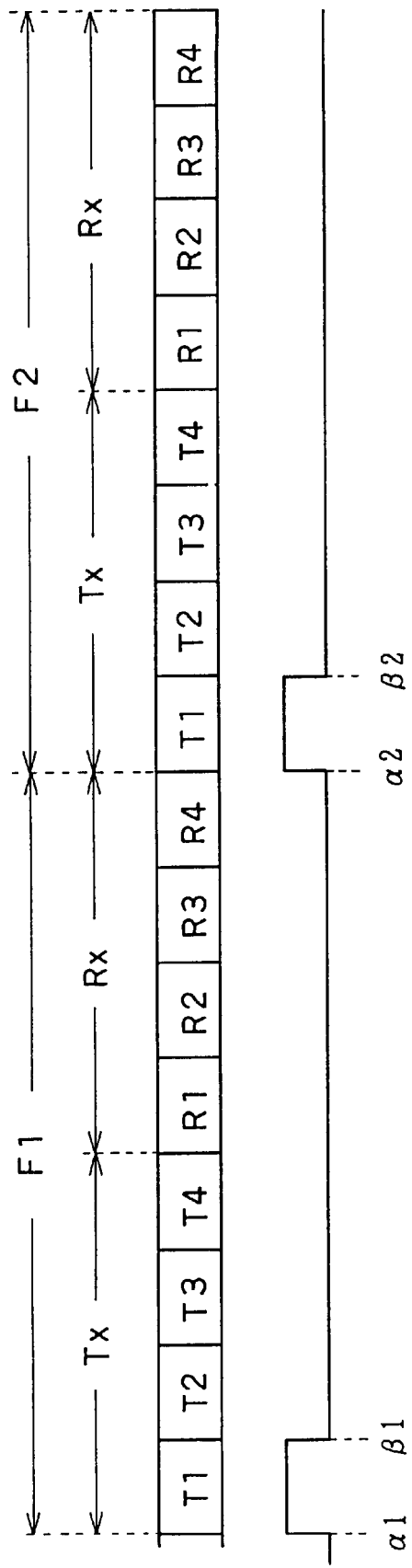
FIG. 3 is a diagram showing the frame structure of the signal used in the PHS.

FIG. 3 shows the frame structure of the signal used in the PHS, taking as examples the first and second frames F1 and F2. One frame lasts for 5 milliseconds. Each of the frames F1 and F2 consists of an interval Tx in which the base station transmits data and the like to the receiver and an interval Rx subsequent thereto in which, in exchange, the receiver transmits data and the like to the base station. The intervals Tx and Rx are each subdivided into four intervals (T1 to T4 and R1 to R4). Each of these subdivided intervals is called a slot. Within each of the intervals Tx and Rx, one slot is allotted to one receiver (portable terminal). Accordingly, in the example shown in the FIGURE, a single frame permits four receivers to communicate with the base station.

For example, when the base station is communicating with a receiver, the receiver receives the signal addressed thereto for an interval of 625 microseconds that is allotted thereto, and receives other signals during the other intervals. Accordingly, although the receiver theoretically needs to eliminate a deviation of ±4 bits of the bit clock within one frame as described previously, in this case, where the interval in which the receiver actually receives the signal occupies one slot that lasts for a time interval as short as 625 microseconds, it can safely be said that the receiver has only to eliminate a deviation of ±½ bit of the bit clock. For this reason, in this embodiment, as will be described later, the jitter elimination circuit 4 (see FIG. 1) is initialized at the start of a frame.

Figure 4:
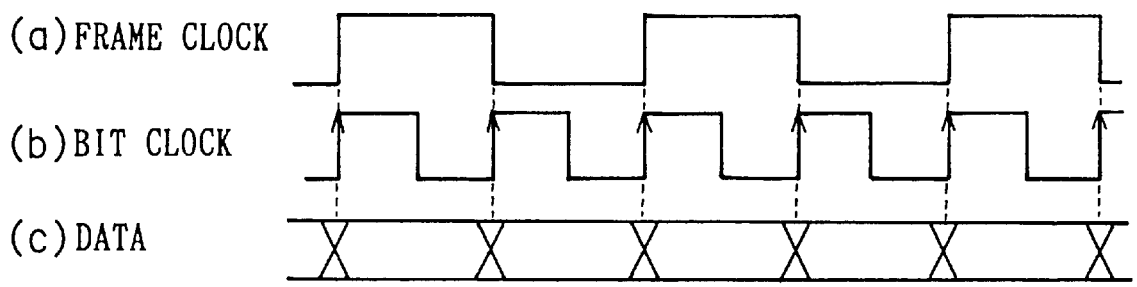
FIG. 4 is a diagram showing the relationship among the frame clock, the bit clock, and the reproduced data in the receiver of the embodiment.

In the present specification, the frame clock and the bit clock are defined as follows. In FIG. 4, at (a) is shown the frame clock, at (b) is shown the bit clock, and at (c) is shown the data. One slot consists of 240 bits, and therefore the bit clock has a frequency of 240 bits/625 microseconds =384 kHz. The data is refreshed in synchronism with rising edges of the bit clock. The frame clock has a period twice the period of the bit clock, and therefore the data is refreshed every time the frame clock changes its level.

Figure 5:
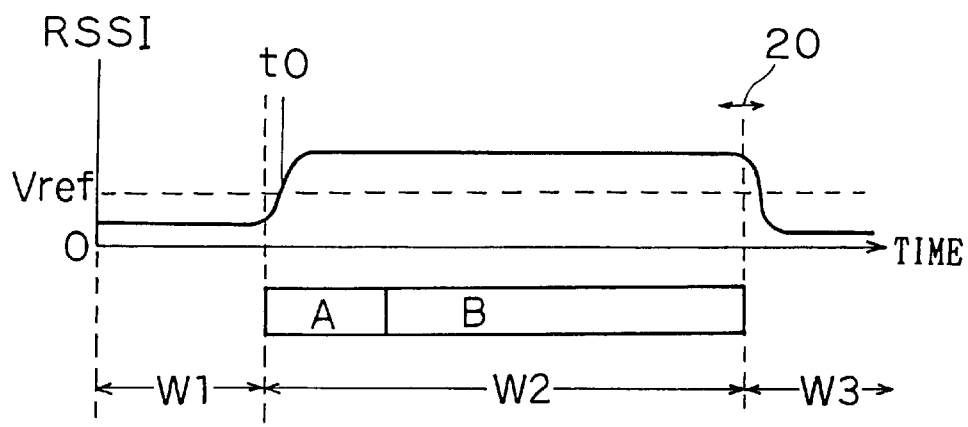
FIG. 5 is a diagram illustrating the operation of the signal strength detection circuit of the receiver of the embodiment.

FIG. 5 shows the relationship between the signal strength detection signal RSSI output from the signal strength detection circuit 10 (see FIG. 2) and the threshold voltage Vref. When the receiver is receiving no signal, as in the interval W1, the signal strength detection signal RSSI is lower than the threshold voltage Vref.

When the receiver receives a signal, as in the subsequent interval W2, the signal strength detection signal RSSI starts rising and then, at the time point t0, exceeds the threshold voltage Vref. At this time, the comparison circuit 14 (see FIG. 2) outputs the reset signal RESET to the jitter elimination circuit 4, and thereby the jitter elimination circuit 4 is initialized. In the subsequent interval W3 after the end of the interval W2, the signal strength detection signal RSSI quickly drops until it becomes lower than the threshold voltage Vref.

FIG. 5 shows a case in which the receiver receives a signal corresponding to one slot in the interval W2. In the interval W2, the slot is divided into intervals A and B. The first interval A chiefly serves as a preamble to synchronize the received signal with the processing performed in the receiver. The next interval B is chiefly used to communicate data such as sounds. In this embodiment, initialization is performed at the start of a slot, and therefore only small jitters are left to be eliminated at the end of the slot shown by numeral 20 and arrows.

Figures 6, 7:
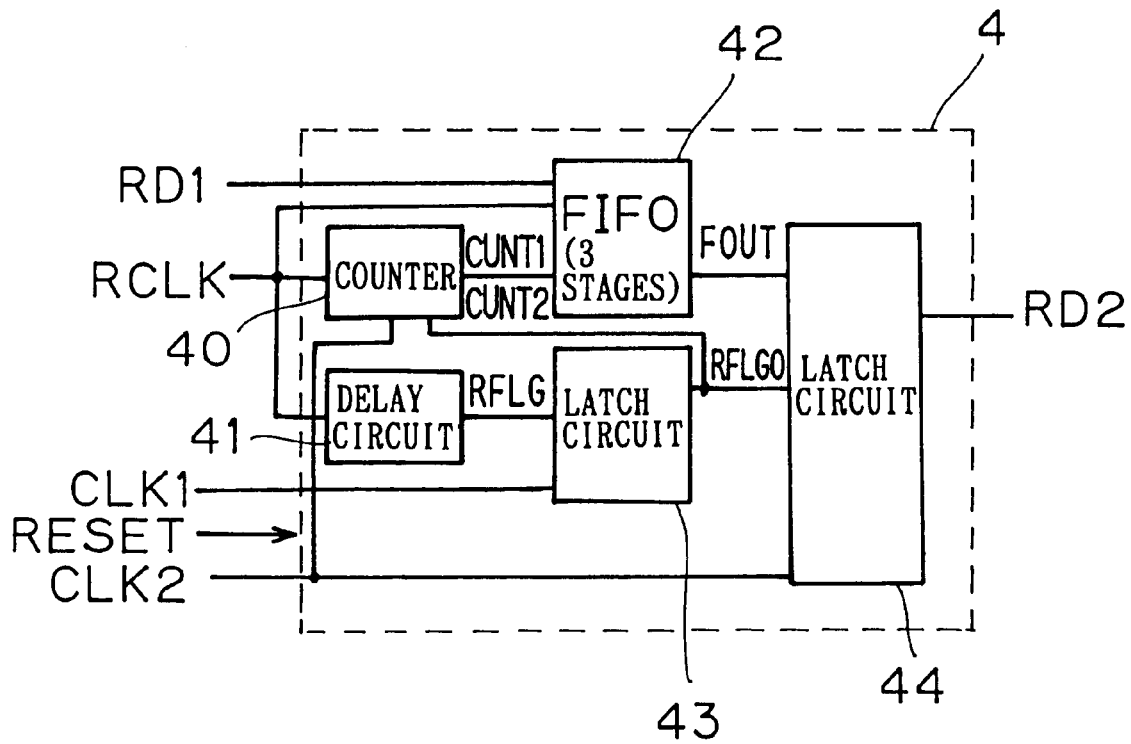
FIG. 6 is a block diagram of the jitter elimination circuit of the receiver of the embodiment.
FIG. 7 is a diagram showing the relationship between the write vector signal and the read vector signal output from the counter of the jitter elimination circuit shown in FIG. 6.

FIG. 6 is a block diagram showing the internal configuration of the jitter elimination circuit 4. The jitter elimination circuit 4 includes a FIFO memory 42 having three memories for storing the reproduced data RD1, a counter 40 for generating vector specification signals CUNT1 and CUNT2 used to specify the vectors (addresses) at which data is written to and read from the FIFO memory 42, a delay circuit 41 for generating a FIFO start flag signal RFLG, a latch circuit 43 for generating a timing signal RFLG0, and a latch circuit 44 for latching the reproduced data FOUT. On receiving the reset signal RESET from the RF circuit 2 (see FIG. 1), the jitter elimination circuit 4 is reset; thus, the counter 40 and the FIFO memory 42 are initialized. CUNT1 is used when data RD1 is written to the FIFO memory 42, and CUNT2 is used when data RD1 is read from the FIFO memory 42.

The reproduced data RD1 is stored in the FIFO memory 42 in synchronism with the reproduced clock RCLK The three memories constituting the FIFO memory 42 will be referred to as FIFO(0), FIFO(1), and FIFO(2). The counter 40, which operates on a two-bit basis, generates the vector specification signal CUNT1 that is used to specify the vector at which the reproduced data RD1 is stored. The counter 40 outputs the vector specification signal CUNT1 by counting the rising edges of the reproduced clock RCLK after resetting (initialization). As shown in FIG. 7, at every rising edge of the reproduced clock RCLK, the value of CUNT1 changes periodically like 0, 1, 2, 0, 1, 2, and so forth. The values 0, 1, and 2 specify the memories FIFO(0), FIFO(1), and HFO(2), respectively.

The counter 40 generates also the vector specification signal CUNT2 that is used to specify the vector at which the data FOUT (data RD1) is retrieved from the FIFO memory 42. The counter 40 outputs the vector specification signal CUNT2 by counting the 38 kHz clock CLK2 output from the oscillator 5. As shown in FIG. 7, the value of CUNT2 changes periodically like 0, 1, 2, 0, 1, 2, and so forth. Note that the counter 40 starts counting CLK2 not immediately after initialization, but after a predetermined delay time produced by the delay circuit 41 and the latch circuit 43.

The delay circuit 41 generates the signal RFLG that indicates that storing of the reproduced data RD1 to the FIFO memory 42 has been started after resetting of the jitter elimination circuit 4 by the reset signal RESET. The latch circuit 43 generates the signal RFLG0 from the signal RFLG and the clock CLK1 and outputs the generated signal RFLG0. This signal RFLG0 indicates the timing with which retrieval of the data stored in the FIFO memory 42 should be started.

Figure 8:
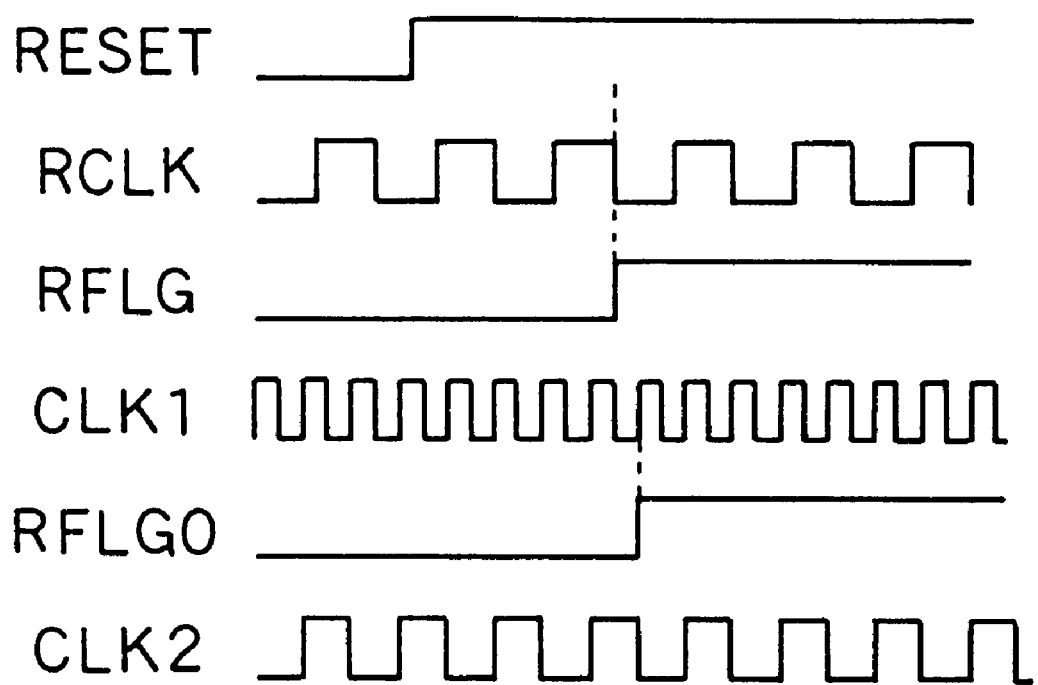
FIG. 8 is a waveform diagram illustrating the operation of the jitter elimination circuit shown in FIG. 6.
Figure 9:
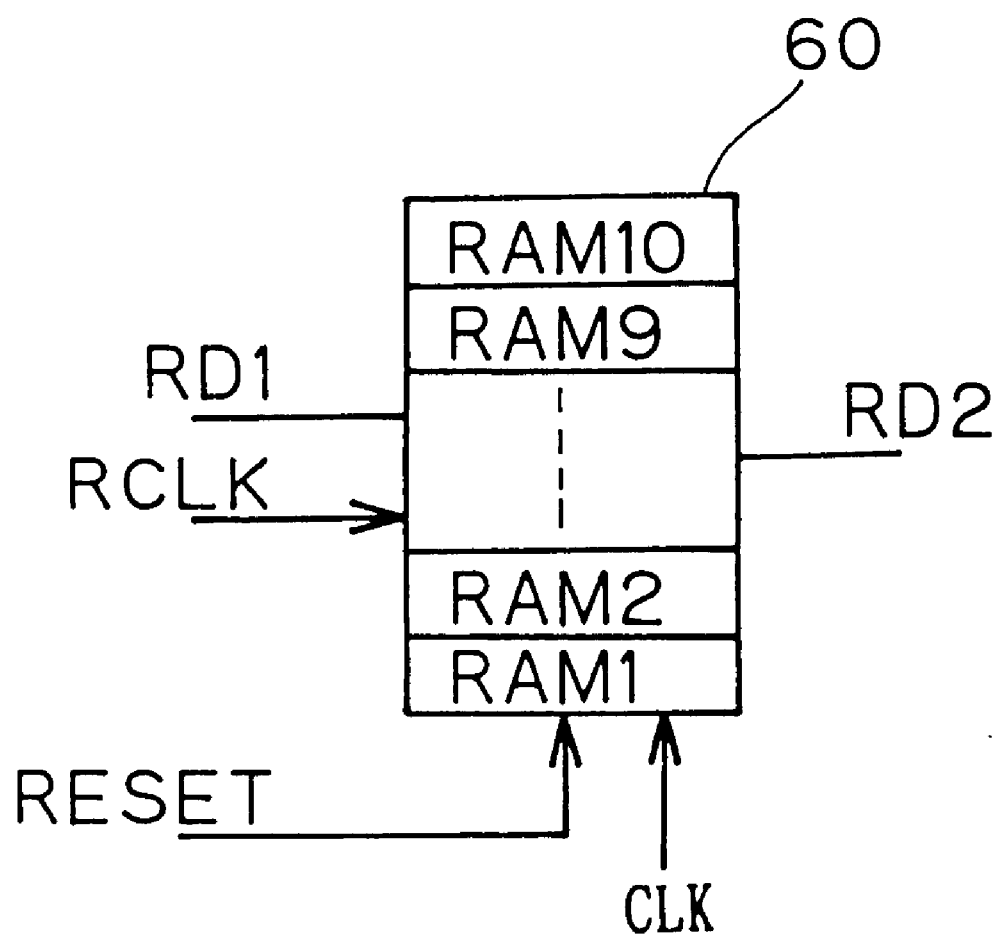
FIG. 9 is a diagram schematically showing the jitter elimination circuit provided in a conventional receiver.

As shown in FIG. 8, after the signal RESET has turned to a high level, the counter 40 counts the reproduced clock RCLK to generate CUNT1. On the other hand, at the second trailing edge of the reproduced clock RCLK after the signal RESET has turned to a high level, the delay circuit 41 outputs RFLG. The latch circuit 43 generates RFLG0 in such a way that RFLG0 turns to a high level at the first rising edge of the clock CLK1 after RFLG has turned to a high level. When RFLG0 turns to a high level, the counter 40 counts the trailing edges of the clock CLK2 to output the vector specification signal CUNT2. The clocks CLK1 and CLK2 are both generated by the oscillation circuit 5 shown in FIG. 1, and CLK1 has a frequency twice as high as the frequency of CLK2. By making the frequency of CLK1 higher (i.e. by shortening its period), it is possible to make RFLG0 turn to a high level more quickly after RFLG has turned to a high level. This makes it possible to start the reading operation as early as possible.

In this embodiment, the jitter elimination circuit 4 is reset for restarting (i.e. initialized) at the start of a PHS signal reception session. For example, in FIG. 3, consider a receiver (portable terminal) that communicates with the base station using the slots T1 and R1. In frame F1, the jitter elimination circuit 4 is reset for restarting at the time point α1 when a received signal is detected, and, in the subsequent frame F2, it is reset for restarting again at the time point α2 when a received signal is detected. In this case, the receiver as a whole starts operating at the time point α1 and keeps operating not only during the interval of the slot T1 but continuously during the subsequent slots T2, 73, T4, R1, R2, R3, and R4 even if no signal is received. The reason that the receiver continues the reception operation even during the slots other than T1 is that where (i.e. in which slot) to receive a signal addressed thereto is not known in advance.

The phase difference between the clocks on the transmitting and receiving sides increases as time passes like T1, 2, . . . , R4. However, the phase difference has no effect in the slots T2 and after, because these slots have nothing to do with the reception operation of the receiver in question. In other words, during the reception operation of this receiver (i.e. during the slot T1), there exists only a small phase difference between the clocks on the transmitting and receiving sides. This means that jitters can be eliminated more easily, and that the FIFO memory 42 requires less storage capacity. By contrast, if the jitter elimination circuit 4 is reset for restarting at the time points β1 and β2 shown in FIG. 3, the receiver needs to perform signal processing in the subsequent slot where it needs to perform the reception operation in the presence of a larger phase difference between the two clocks. This means that jitters cannot be eliminated easily, and that the FIFO memory requires more storage capacity.

In the above description, it is assumed that the signal received during the slot T1 is the signal addressed to the receiver in question. In a case where the signal received during the slot T3 is the signal addressed to the receiver in question, the jitter elimination circuit is initialized (i.e. reset for starting) at the start of the slot T3.

Back in FIG. 6, when the signal RFLG0 is at a high level, the latch circuit 44 latches the data FOUT and outputs the data RD2 at the rising edges of the clock CLK2. The latch circuit 44 serves to perform waveform shaping on the data FOUT retrieved from the FIFO memory 42.

As described above, in the receiver of this embodiment for receiving a signal transmitted by a time-division multi-access method, the jitter elimination circuit 4 is reset at the start of a signal reception session by the use of the signal strength detection circuit 10 provided in the RF circuit 2. This makes it possible to eliminate jitters while the jitters are relatively small, and thus helps reduce the storage capacity required in the memory provided in the jitter elimination circuit 4.

Moreover, by reducing the storage capacity of the FIFO memory 42, it is possible to shorten the delay time that arises between the time point when the jitter elimination circuit 4 stores the reproduced data RD1 and the time point when it outputs it as the data RD2. This makes it possible to quicken the processes performed by the receiver, for example, for achieving synchronism with the received signal and for searching for a base station.

In this embodiment, as shown in FIG. 6, both the counter 40 and the FIFO memory 42 are initialized. However, the same effect can be obtained by initializing the counter 40 and the latch circuit 43 without initializing the FIFO memory 42. Moreover, although the PHS is taken as an example in the above description of the embodiment, it is possible, in principle with any signal transmitted by a time-division multi-access method, to reduce the storage capacity of the memory by initializing the jitter elimination circuit in accordance with the result of detection by the signal strength detection circuit.

What is claimed is:

1. A receiver for receiving a signal transmitted by a time-division multi-access method, comprising:
   a signal strength detection circuit for outputting a reset signal when detecting a stronger signal strength of a signal transmitted by a multi-access method than a predetermined level at the start of a signal reception session in each reception cycle;
   a demodulator for demodulating the signal to output reproduced data and a reproduced clock;
   an oscillator for outputting an internal clock;
   a memory to which the reproduced data is written in synchronism with the reproduced clock and from which the reproduced data is read in synchronism with the internal clock; and
   an initialization circuit for initializing timing with which the reproduced data is written to and read from the memory in accordance with the reset signal,
   wherein the reset signal prevents a difference in timing with which the reproduced data is written at one frequency to and read at another frequency from the memory from becoming larger during reception.

2. A receiver as claimed in claim 1,
   wherein the receiver is a portable terminal for receiving a signal transmitted by a time-division multi-access method from a base station of a Personal Handyphone System.

3. A receiver as claimed in claim 1,
   wherein the memory is a FIFO memory.

4. A receiving for receiving a signal transmitted by a time-division multi-access method that divides one frame into a plurality of communication slots in conducting communication, comprising:
   a signal strength detection circuit for detecting signal strength of a received RF signal;
   a comparison circuit for comparing an output fed from the signal strength detection circuit with a predetermined level at the start of a signal reception session in each frame and outputting a reset signal when the output is stronger than the predetermined level;
   a demodulation circuit for demodulating the received RF signal to obtain therefrom reproduced data and a reproduced clock;
   an oscillation circuit for generating an internal clock;
   a jitter elimination circuit for eliminating jitters from the reproduced data by writing the reproduced data to memory in synchronism with the reproduced clock and reading the reproduced data from the memory in synchronism with the internal clock;
   a processing circuit for decoding the reproduced data after jitter elimination; and
   an initialization circuit for initializing the jitter elimination circuit in accordance with the reset signal,
   wherein the reset signal prevents a difference in timing with which the reproduced data is written at one frequency to and read at another frequency from the memory from becoming larger during reception.

5. A receiver as claimed in claim 4,
   wherein the initialization circuit initializes also the memory.

6. A receiver as claimed in claim 4,
   wherein the initialization circuit initializes timing with which the reproduced data is written to and read from the memory.

7. A receiver as claimed in claim 4,
   wherein the memory is a FIFO memory.

8. A receiver as claimed in claim 4,
   wherein the receiver is a portable terminal for a Personal Handyphone System.

9. A receiver for receiving a signal transmitted by a time-division multi-access method that divides one frame into a plurality of communication slots in conducting communication, comprising:
   an envelope detector for extracting an amplitude component from a received RF signal;
   an A/D converter for converting the amplitude component into a digital signal;
   a signal strength detection circuit for integrating the digital signal and outputting a resulting signal as a signal strength detection signal;
   a comparison circuit for comparing an output level of the signal strength detection signal with a predetermined level at a start of a signal reception session in a communication slot assigned to a receiver in each frame and outputting a reset signal when the output level is stronger than the predetermined level;
   a demodulation circuit for demodulating the received RF signal so as to output reproduced data and a reproduced clock;
   an oscillation circuit for generating an internal clock;
   a jitter elimination circuit that, when the reset signal is input, starts storing the reproduced data in a memory in synchronism with the reproduced clock and, after a predetermined delay time, starts reading and outputting the reproduced data sequentially from the memory in synchronism with the internal clock; and
   a processing circuit for decoding the reproduced data from the jitter elimination circuit.

10. A receiver as claimed in claim 9,
    wherein the jitter elimination circuit further comprises:
    a FIFO memory having a plurality of stages;
    a counter for generating a first vector specification signal to specify a stage at which the reproduced data is written to and a second vector specification signal to specify a stage at which the reproduced data is read from;
    a delay circuit for outputting a first delay signal with which the second vector specification signal is generated after the first vector specification signal;
    a first latch circuit for feeding a second delay signal to the counter after receiving and latching the first delay signal so that the counter starts generating the second vector specification signal; and
    a second latch circuit for holding temporarily and outputting data read from the stage of the FIFO memory specified by the second vector specification signal.

* * * * *